United States Patent [19]

Kent, Jr.

[11] 4,179,152
[45] Dec. 18, 1979

[54] METHOD AND APPARATUS FOR SECURING FABRIC TOPS TO A VEHICLE

[76] Inventor: James K. Kent, Jr., 18014 San Gabriel, Cerritos, Calif. 90048

[21] Appl. No.: 815,201

[22] Filed: Jul. 13, 1977

[51] Int. Cl.² .............................................. B60J 1/20
[52] U.S. Cl. .................................. 296/196; 296/141; 296/206; 2/DIG. 6
[58] Field of Search ...................... 296/28 E, 28 R, 48, 296/100, 121, 131, 132, 136, 141, 137 B, 137 C; 2/DIG. 6; 135/15 CF

[56] References Cited

U.S. PATENT DOCUMENTS

| | | | |
|---|---|---|---|
| 1,627,457 | 3/1927 | Pritchett | 296/141 |
| 3,538,914 | 11/1970 | Myers | 2/DIG. 6 |

*Primary Examiner*—Philip Goodman
*Attorney, Agent, or Firm*—William C. Babcock

[57] ABSTRACT

A method and apparatus for wind-proofing during inclement weather the connecting edges of a fabric top deployed on four-wheeled vehicles is set out, wherein the fabric top is conventionally secured to the frame of the vehicle by way of various fasteners, the interspaces between such fasteners being further secured by pile strips mounted on semi-rigid material adhesively attached to the vehicle. The corresponding segments of the fabric top are similarly provided with overlying loop strips sewn to the fabric, the loop engaging the pile in a manner similar to that achieved by the material structure commonly sold under the mark "VELCRO." It is intended to dispose such attachment strips at the wind-receiving locations in the vehicle, such as for example, at the leading edge of the door and at the attachment edges of the top.

1 Claim, 3 Drawing Figures

METHOD AND APPARATUS FOR SECURING FABRIC TOPS TO A VEHICLE

BACKGROUND OF THE INVENTION

1. Field of the Invention

The present invention relates to method and apparatus for attaching fabric tops to a vehicle, and more particularly to techniques in wind-proofing the attachment features thereof.

2. Description of the Prior Art

Heretofor most four-wheeled vehicles such as those utilized in recreational activities and outdoor use included as a means providing shelter various forms of fabric tops elected over structural framework. Typically such fabric tops would attach to the frame of the vehicle by way of a plurality of snap fasteners of similar devices both for convenience in installation and in manufacture. One of the more prevailing disadvantages of this manner of attachment is the loose interspaces that are formed through which wind and other elements are free to enter into the sheltered area, creating discomfort to the passengers. Typically outdoorsmen prefer vehicles of the more rugged type which are commonly mechanically simple and therefore reliable. Under the abuse of recreational exposure or field exposure, the more conventional and complex techniques for attaching fabric tops, such as those found in convertible passenger automobiles, are less than favorable and the outdoorsmen will therefore either tolerate the unnecessary exposure to weather or elect to use hard-topped vehicles for this purpose. In each instance it is the mechanical simplicity that is desired, precluding the more comfortable complex system.

SUMMARY OF THE INVENTION

Accordingly, it is the general purpose and object of the present invention to provide for a technique by which the interspaces formed between the attachment points of a fabric top are conveniently sealed against the elements.

Other objects of the invention are to provide a technique for sealing the attaching edges of a fabric top in a manner which is simple, conveniently used, and which does not detract from the original reliability of the fastening system.

Yet additional objects of the invention are to provide a technique whereby a fabric top is attachable to a vehicle frame by way of continual strips adapted for engagement and release whereby initial installation is made with greater ease (time saving) and less destruction to the interfacing matal of the vehicle on a repetitive basis.

Briefly these and other objects are accomplished within the present invention by attaching strips of pile material to semi-rigid backing strips which, in turn, are placed at selected attachment edges of the vehicle. In the preferred configuration it is intended to dispose such strips between the normally available snap fasteners, the corresponding edges of the fabric top being similarly provided with loop strips, the loop and pile being adapted for repetitive engagement in a manner similar to that achieved by the material structure sold under the mark "VELCRO".

DESCRIPTION OF THE SPECIFIC EMBODIMENT

While the following description sets out with particularily, a method for attaching a fabric top to a recreational vehicle like a Jeep, such is exemplary only. It is to be understood that vehicles other than the one set out may use to advantage the features disclosed herein and no intent to limit the scope of the invention by the choice of the illustration is expressed.

Figure 1:
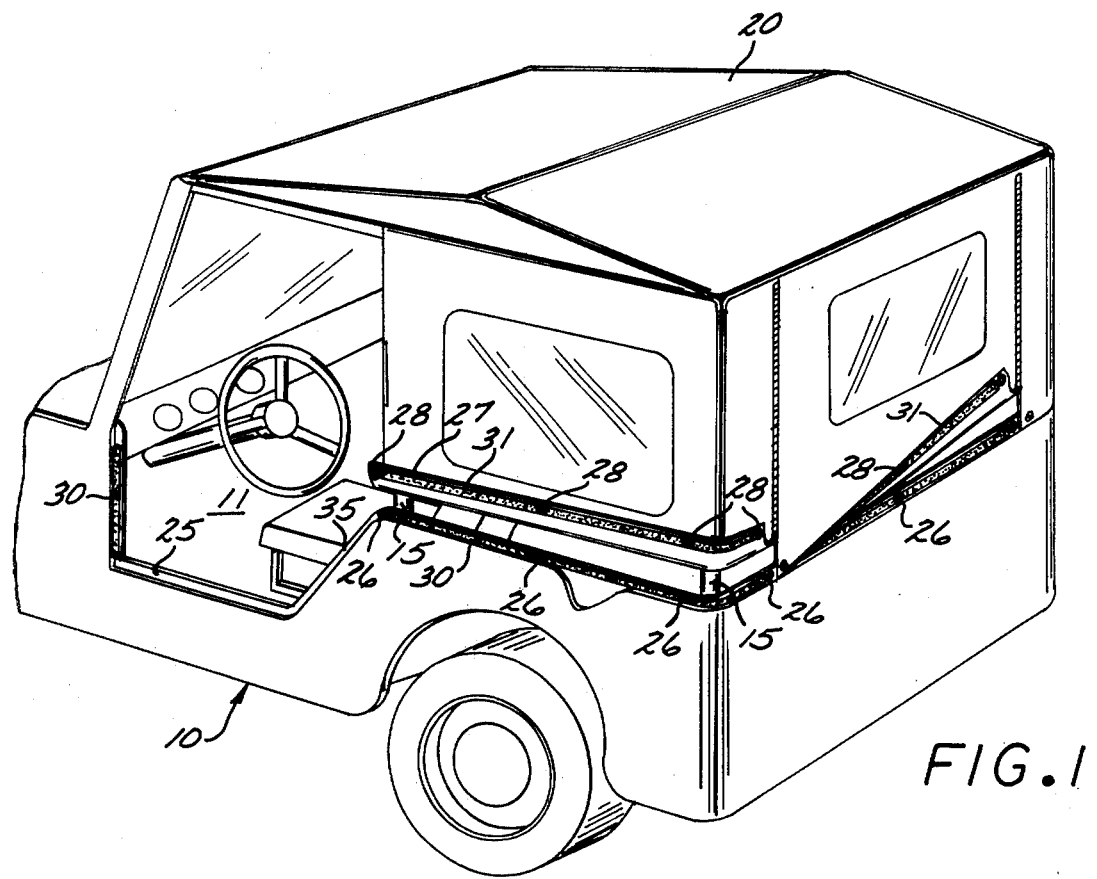
FIG. 1 is a perspective illustration of a recreational vehicle modified to include sealing means constructed according to the present invention.
Figure 2:
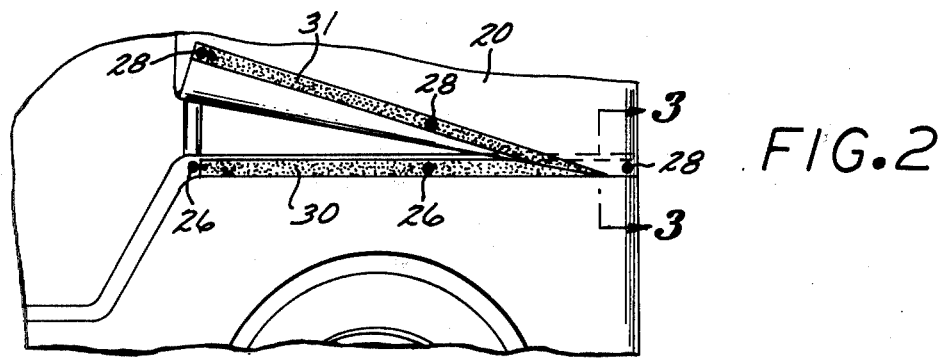
FIG. 2 is a side view detail illustrating the process of engagement or release of the attachment devices set out in FIG. 1.

As shown in FIGS. 1 and 2, a recreational vehicle generally designated by the numeral 10 typically comprises a passenger cavity 11 often enclosed by a roll cage comprising several tubular members commonly designated herein as tubular members 15. In alternative configurations to the tubular members 15 may comprise a skeletal structure removable at will, and in either form it is these members that provide the supporting elements for a fabric top or covering shown herein as a top 20. In normal use, the vehicle 10 is typically driven without the top 20 and only on such occassions as are dictated by weather is the top utilized. Furthermore, in interest of easy access and utility, the passenger compartment is typically in the form of a rectangular cavity and it is to the edges of this cavity 11 that the top is secured. For this purpose the vehicle 10 shown herein includes a recessed edge frame shown by way of a peripheral recess or offset 25 having distributed thereover at various attachment points a plurality of fasteners 26 which are insertable in the corresponding edges 27 of the top 20. More specifically, this insertion of fastener 26 is achieved by way of a corresponding grommet 28 dispersed along the edge 27 and is by virtue of these attachments that the necessary stretching and fixation of the fabric comprising the top 20 is made.

Heretofor the interspaces between the various fasteners 26 were left unattached, it being the intent to provide sufficient stretch therebetween to maintain the edge 27 within the corresponding recess 25. As the fabric of the top 20 ages, the repeated stress applications thereto tend to expand the material with the resulting edge gaps through which elements are then free to enter into the enclosure. It is for this purpose that the present attaching technique is directed. More specifically shown distributed within the peripheral recess 25 are a plurality of pile segments 30, each conformed as a strip of a length bounded by the adjacent fasteners 26. A corresponding strip of loops 31 is attached to the interior surface of the fabric of the roof 20 being aligned along edge 27 in an overlying disposition relative the pile strips 30. Thus, interspaced between the adjacent grommets 28 are the corresponding strips 31 which by way of the pile-to-loop engagement achieved as for example in the product known as "VELCRO," will provide a continual strip of engaging structure.

As shown in FIG. 2, in particular, both removal and installation of the roof 20 so modified follow the conventional procedure. In this instance, the roof covering 20 is shown separated from the fastener 30 at the corner of a door opening 35 which normally also coincides with a vertical edge in the cover 20. In this illustration, therefore, there is a progressive line of separation from the corner joints which is then propagated along to the next fastener as the next fastener is released the subsequent interspaced segment is similarly separated. This same technique, in reverse, will also achieve a fastening sequence, in each instance a positive alignment by way of the first grommet-to-fastener is provided for all of the next fasteners and therefore for the loop-and-pile strips that go therebetween.

Figure 3:
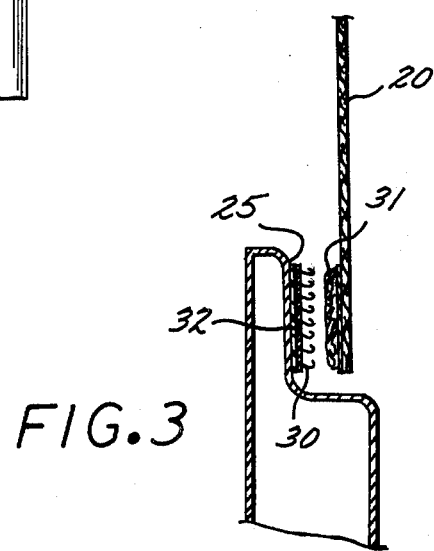
FIG. 3 is a sectional view taken along line 3—3 of FIG. 2.

As shown in detail in FIG. 3 the convenient technique for installing the pile within the recess 25 along the edge of cavity 11 is achieved by way of an underlanement of semi-stiff material 32 having the pile secured to the exposed face thereof and having the rear face adhesively attached within the recess 25. The associated loop strip 31 may, in turn, be attached by any sewing technique directly to the fabric of the top 20.

Referring back to FIG. 1, the foregoing sealing technique may also be used at other critical points such as for example at the leading edge of the doorway 35, shown therein as a leading edge sealing pile strip $30_1$ it being understood that a corresponding loop strip be attached to the normally available door covering at the appropriate location.

Some of the many advantages of the present invention should now be readily apparent. In normal application, it is the function of the roof covering 20 to provide protection from the elements. This same function is dramatically enhanced if and when all of the joining edges are sealed or connected in some manner. The most economic technique of attachment, however, is still best achieved by way of a fastener-to-grommet insertion and it is within these bounds that the disposition of the loop-and-pile strips best achieves its purpose. The geometric formation of these attachments in the form of highly unequal rectangles, i.e. in the form of long strips, allows for the necessary longitudinal deformation to accommodate a certain amount of missmatch during installation.

The loops and pile strips may be reversed to achieve the same effect.

Obviously many modifications and variations to the above disclosure can be made without departing from the spirit of the invention. It is therefore intended that the scope of the invention be determined solely dependent on the claims hereto.

I claim:

1. In a vehicle including a passenger receiving cavity and a deployable fabric top, said top including a plurality of spaced grommets above the edges thereof for receiving corresponding fasteners disposed along the periphery of said cavity, the improvement comprising:
   a plurality of elongate strips of pile dimensioned for receipt between adjacent ones of said fasteners;
   a corresponding plurality of elongate strips of semi-rigid backing adhesively secured to associated ones of said strips of pile, each said strip of backing being, in turn, attached to the periphery of said cavity in interspaced relationship between said fasteners for supporting said strips of pile in exposed alignment;
   a plurality of elongate strips of loop material attached to said top in interspaced disposition between adjacent ones of said grommets said strips of loop material being disposed on the surfaces of said top opposing said strips of pile for unbedding therein;
   said loop strips and said strips of pile are conformed to substantially identical plan forms; and
   said strips of backing are secured to the periphery of said cavity by adhesive.

* * * * *